Patented Mar. 12, 1929.

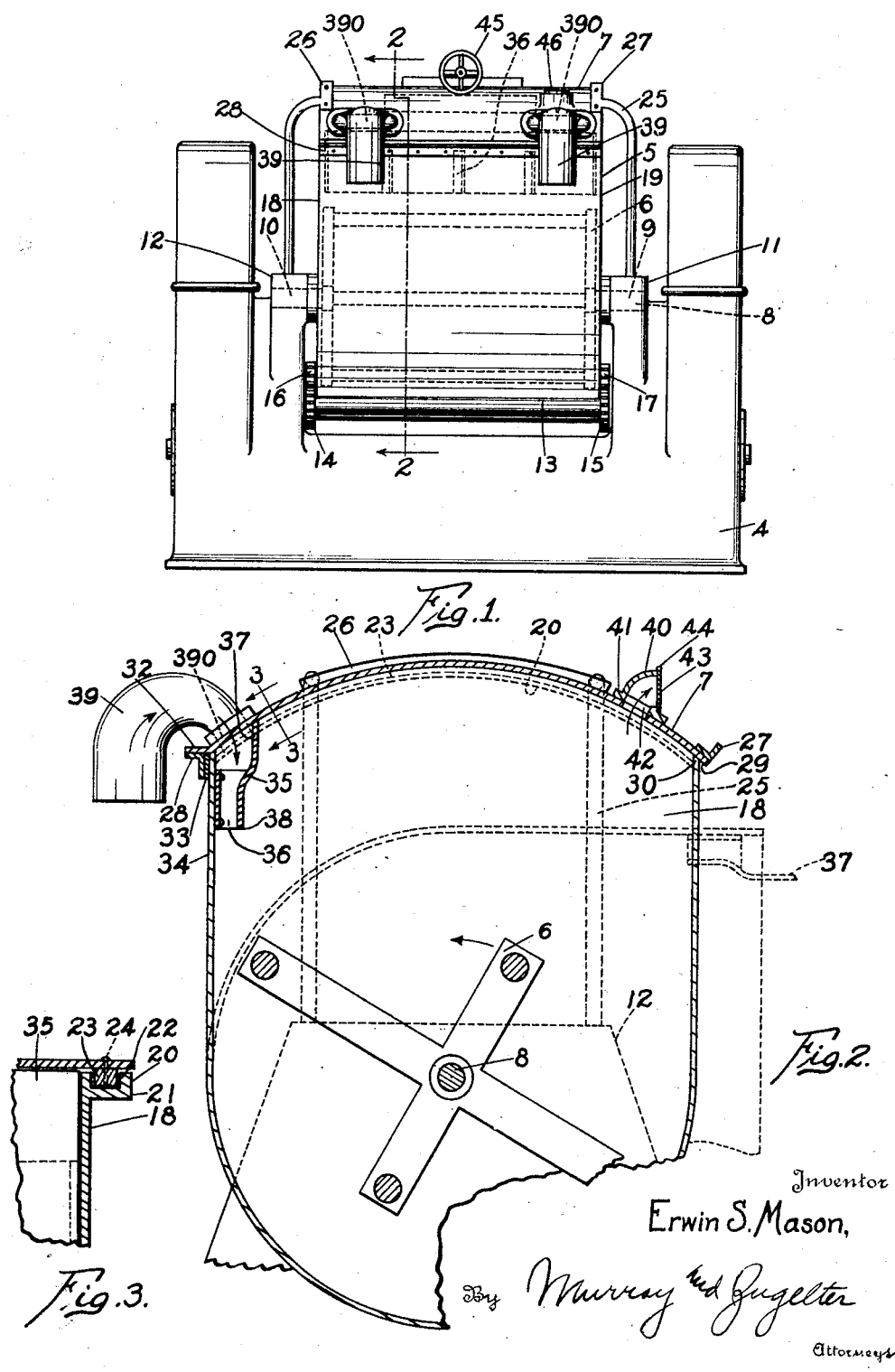

1,705,127

UNITED STATES PATENT OFFICE.

ERWIN S. MASON, OF NORWOOD, OHIO.

MIXER FOR PLASTICS.

Application filed January 13, 1926. Serial No. 81,102.

This invention relates to improvements in mixing tanks wherein the ingredients are acted upon by agitators, and are cooled by means of air pressure admitted into the tank for preventing excessive temperature caused by frictional heat.

An object of my invention is to provide an air cooled tilting tank for mixers of plastic materials such as dough mixers which will obviate the necessity of detachable air supply lines for directing a cooling medium into the tank.

Another object is to provide a means comprising a baffle plate for directing a current of air under pressure inside the tank, said means also serving as a splash plate to prevent leakage of the contents thereof and as a scraper for removing any substance adhering to the cover of the tank.

Another object is to so construct and position the baffle plate that cleaning of the tank and baffle plate is facilitated.

These and other objects are attained by the means described herein and disclosed in the accompanying drawings, in which:

Fig. 1 is a plan view of the rear of a dough mixing machine embodying the device of my invention.

Fig. 2 is a cross sectional view on line 2—2 of Fig. 1.

Fig. 3 is a sectional view on line 3—3 of Fig. 2.

In the device of my invention the air supply lines are fixedly secured to a stationary cover for the tank, to admit air into the tank through perforations in the cover. This means obviates the connecting and disconnecting of the air supply each time the tank is raised or tilted. A baffle plate is provided within the tank for directing the air interiorly of the tank. In addition to directing the air, this plate, by novel arrangement and construction, serves also as a splash plate for protecting otherwise exposed joints of the tank, functions as an interceptor and cooler of the substance being mixed and thrown against the wall of the tank, acts as a scraper for removing substance adhering to the under surface of the cover and permits of ready cleaning of the interior of the tank and baffle plate.

The dough mixer comprises a base 4, tiltable mixing tank 5, an agitator 6, and a stationary arcuate canopy cover 7. The base 4, carries the driving mechanism (not shown) for rotating the agitator 6 about its shaft 8, the ends 9 and 10 of which are journaled in suitable bearings in the leg frames 11 and 12. The tank 5 is adapted to be tilted about the shaft 8, to assume a substantially horizontal position as shown by dotted lines in Fig. 2 for dumping the contents thereof and for cleaning purposes. The tilting means comprises a selectively driven shaft 13, carrying pinions 14 and 15, which engage gear sectors 16 and 17, secured to the end walls 18 and 19 of the tank 5.

In order to effectively seal the tank when the device is in an operative position, the upper ends 21 of the end walls 18 and 19 are made arcuate in form and are provided with integral, longitudinal, arcuate flanges 20, (see Fig. 3). The flanges 20 are provided with longitudinal grooves 22 for receiving a longitudinal arcuate tongue or key 23, secured to the under face 29, of the canopy cover 7, by means of rivets or screws 24. The arcuate parts are constructed with radii equal in length to their respective distances from the center of shaft 8, about which the tank 5 may be tilted. Thus it will be apparent that when the tank is in an operative position, the tongue 23 and the groove 22, form an effective seal between the sides of the tank and the canopy cover for precluding any splashing of the contents therefrom.

The canopy cover 7 is fixedly supported above the tank 5 by stanchions 25, secured to the leg frames 11 and 12. Integral with or connected to stanchions 25, are arcuate cast members 26 and 27 which serve to support the canopy and to impart to it the arcuate shape of the adjacent members. Stiffening member 27 is secured to the forward end of the canopy cover to insure perfect coincidence of the under face 29 of the cover 7 with edge 30 of the front wall 31 of the tank. At the rear edge 32 of the canopy cover is secured a longitudinally extending angle iron 28 faced with a rubber strip 33, which cooperates with the rear wall 34 of the tank to preclude leakage and running of the contents thereof down the rear wall to the floor or base.

A rectangular baffle plate 35 is secured to the ends 18 and 19, and the rear wall 34 of the tank, said plate being spaced from the rear wall 34 by spacer brackets 36. The upper edge 37 of the plate 35 is brought within close proximity of the canopy cover for scraping from the under side of the cover any dough or sticking substance adhering thereto prior to the tilting of the tank. As the canopy is stationary, and the plate 35 moves with the tank while being tilted, it is apparent that the edge 37 will scrape the entire exposed under surface of the canopy cover. The lower edge 38 of the plate 35 is disposed below the joint at the top edge of the rear wall 34. Thus, any substance splashed toward the plate by the agitator will be precluded from forcing its way through the joint.

Riveted or otherwise fixedly mounted over an aperture 390 in the immovable canopy cover 7, is an air supply connection 39, which is in communication with the inside of the tank behind the baffle plate or splash plate 35. Air entering the tank in the direction of the arrows will be directed downwardly along the rear wall and bottom of the tank, and will be exhausted through the vent or exhaust valve 40. Thus, the substance to be mixed is cooled and the blast of air is utilized, in addition, to cool all sides of the tank. Plate 35 serves also as an interceptor for the substance being mixed, which tends to leave the agitator because of centrifugal force and to strike the rear wall of the tank. The passing of the air along the plate overcomes the heat of friction thus created and keeps the plate in a cool condition. Vent or exhaust 40 comprises a casting 41 of any suitable length positioned over an aperture 42 in the canopy cover, and is provided with a freely swinging door 43, hingedly mounted on the casting at 44. By this exhaust means, no foreign particles can enter the tank, as the door opens but slightly, the amount of opening depending upon the amount of air admitted to the tank. The cover is provided with inlets for ingredients, and doors for closing the inlets. Mechanisms for controlling the doors are designated by 45 and 46, and are usual equipment on the type of tank described.

It should be noted that in the closed or operative position, the tank is leak proof due to the tongue and groove construction, and the joint at the canopy cover and rear wall of tank is protected by the baffle plate 35. Furthermore, the tank may be tilted without disconnecting the air supply lines, which may be automatically shut off upon the tilting of the tank. Upon tilting of the tank, the plate 35 functions as a scraper for removing adhering matter from the under face of the canopy cover.

While the exhaust 40 is shown as being a longitudinal aperture provided with a swinging door, it may consist of any suitable exhaust means, such as an opening provided with a pipe which may carry a butterfly or other suitable valve. In this manner, air from the mixing tank may be exhausted exteriorly of the room in which the machine is situated.

What I claim is:

1. In a device of the class described, the combination with a base, of an arcuate canopy cover fixedly mounted upon the base and provided with a perforation near its rear edge, an air supply line fixedly secured to the cover over the perforation therein, transversely disposed arcuate tongues on the under face of the cover, stiffening members extending longitudinally of the cover, means for precluding leakage, a tiltable tank adapted in operative position to be closed by the cover and comprising end walls, the top edges of which are arcuate to conform with the arcuate cover, a grooved flange bounding said top edges, the groove receiving the tongue on the cover, a baffle plate disposed within the tank adjacent and parallel to the rear wall thereof, and disposed forwardly of the perforation in the cover when in an operative position, the upper edge of the plate being disposed in close proximity with the arcuate under face of the canopy cover for removing adhering substance from the cover, the plate extending below the joint made by the canopy cover and rear wall of the tank, tilting means operable upon the tank, agitating means within the tank, and an exhaust port valve for discharging air from the tank.

2. In a device of the class described, the combination with a base, of a perforate arcuate canopy cover fixedly mounted upon the base, an air supply line fixedly secured to the cover in registration with a perforation near its rear edge, a tiltable mixing tank adapted normally to be closed by the cover and comprising end walls, the upper ends of the walls being arcuate in form to conform with the canopy cover, co-operative sliding means on the cover and the end walls of the tank for effecting a seal therebetween, means for sealing the remaining joints between the cover and tank, a rectangular baffle plate disposed within the tank adjacent the rear wall thereof, its top edge being disposed in close proximity with the lower face of the arcuate canopy cover for removing adhering substance from the cover, the plate extending below the joint between the rear wall of tank and the rear edge of the canopy cover, the plate further serving as an interceptor and air deflector, means for tilting the tank, agitating means within the tank, and a valve associated with a second perforation in the canopy cover for discharging air from the tank.

3. In a device of the class described, the combination of a perforate stationary canopy cover, an air supply line secured to the cover and registering with one of the perforations, an exhaust valve associated with another of the perforations, a tank, movable relative to the cover, and comprising side walls adapted to register with the canopy cover to effect a seal therebetween when the tank is in an operative position, a baffle plate within the tank for directing the air from the supply line, said plate being so disposed as to serve also as a splash plate, as an interceptor plate and as a scraper, means for tilting the tank, and an agitator within the tank.

4. In combination with a tiltable mixing tank, an agitator, a baffle plate disposed within the tank adjacent and spaced from a wall thereof, a fixed perforate canopy cover for the tank, means carried by the tank for scraping the under side of the canopy cover, an air supply line secured to the canopy cover in registration with a perforation therein for admitting air under pressure into the tank, means for tilting the tank, and means associated with the remaining perforations in the cover for controlling the feeding of ingredients into the tank and for air exhaust.

5. The combination of a cover having a perforation near its rear edge and an exhaust port near its opposite edge, a tank movable relative to the cover, a baffle plate within the tank and spaced from the rear wall thereof, an air supply connection fixedly secured to the cover and over the perforation for admitting air into the tank between the baffle plate and the rear wall, means associated with the baffle plate for removing adhering substance from the under side of the cover, agitating means within the tank and means for moving the tank relative to the cover.

6. The combination of a tank and a cover therefor movable relative one to the other, the cover having a perforation for admitting a cooling medium into the tank, an agitator in the tank, and a baffle plate carried by the tank for shielding the opening in the cover from substance within the tank operated upon by the agitator and for directing a cooling medium from the opening in the top to the substance in the tank.

7. The combination of a tank and a cover therefor movable relative one to the other, the cover having a perforation for admitting cooling medium at one side of the tank, a revoluble agitator in the tank moving downwardly below the opening in the cover, and a depending baffle plate disposed between the opening in the cover and the uppermost portion of the agitator whereby the baffle precludes entry into the perforation in the cover, of any substances operated upon by the agitator.

8. The combination of a cover, a tank, the tank and cover having relative movement one to the other, a baffle plate carried by the tank and spaced from a wall thereof for intercepting substance directed toward said wall, a scraper edge on the baffle plate, the scraper edge of the plate being adapted for removing adhering substance from the under surface of the cover upon relative movement of the tank and cover.

9. The combination with a support means, of a cover fixedly secured to the support means, a tank adapted to be moved relatively to and closed by the cover when in an operative position, means carried by the cover for admitting air under pressure into the tank, air exhaust means, agitating means, and a baffle plate for directing the air under pressure and for intercepting substance thrown by the agitator.

10. The combination of a stationary cover, a tank movable relative to the cover and adapted to be closed by the cover when in an operative position, an agitator and a baffle plate within the tank, the baffle plate being adapted for intercepting substance thrown from the agitator toward the joint made by the cover and the tank.

11. The combination of a stationary cover, a tank movable relative to the cover and adapted to be closed by the cover when the tank is in an operative position, an agitator in the tank, a baffle plate comprising a scraper portion at its upper edge, the baffle plate being so positioned as to serve as a scraper for the under side of the cover, and as an intercepter for substance thrown from the agitator.

12. The combination of a tiltable tank comprising a front and rear wall, a bottom, and end walls having arcuate top portions, an arcuate perforate stationary cover for closing the tank when it is in an upright position, a depending flange secured to the cover adjacent its rear edge, a resilient padding on the flange, the padded flange being adapted to abut the rear wall of the tank upon the tank being righted, a baffle plate comprising a scraper adapted to scrape adhering substance from the under side of the arcuate cover, the baffle plate being spaced from the rear wall and extending downwardly for a distance so as to protect the joint made by the rear wall and the cover, from substance being mixed within the tank, means associated with a perforation in the cover for forcing air under pressure downwardly into the tank between the baffle plate and the rear wall, an agitator, and an exhaust valve over a second perforation in the cover.

13. The combination with a tiltable tank comprising walls and a bottom, a stationary cover therefor, a depending flange carried by the cover and which the rear wall of the tank abuts for effecting a seal when the tank is in an upright position, an agitator within the tank, and a baffle plate spaced from the rear wall of the tank and extending downwardly to protect the joint made by the rear wall and the depending flange from substance directed toward the joint by the action of the agitator.

14. The combination with a tiltable tank comprising walls and a bottom, a stationary perforate cover therefor, a depending flange carried by the cover for abutting the rear wall of the tank when the tank is in an upright position, for effecting a seal, an agitator within the tank, a baffle plate spaced from the rear wall of the tank and extending downwardly for protecting the joint made by the rear wall and the depending flange from substance directed toward the joint by the action of the agitator, means associated with a perforation in the cover for admitting air under pressure into the tank at a point intermediate the baffle plate and the rear wall of the tank, whereby the baffle plate is cooled and the air is directed downwardly into the tank by the baffle plate, and air exhaust means associated with a second perforation in the cover.

15. The combination of a tiltable mixing tank comprising side walls, a front and rear wall, and a bottom, a stationary perforate cover therefor, means associated with the rear wall and the cover for effecting a sealed joint therebetween when the tank is in a normally upright position, a baffle plate comprising a scraper, spaced from the rear wall and the sealed joint and extending for a distance below and above the sealed joint to protect the joint from substance being mixed within the tank, the scraper on the baffle plate being adapted for scraping adhering substance from the under side of the cover upon tilting of the tank, an air connection over a perforation in the cover for admitting air under pressure into the tank, said perforation and connection being disposed between the baffle plate and the rear wall of the tank whereby the baffle plate and the tank walls are cooled by the incoming air, an exhaust valve disposed over a second perforation in the cover, and an agitator within the tank.

16. The combination of a tiltable mixing tank comprising side walls, and a bottom, a stationary perforate cover therefor, abutting means carried by the cover adjacent an edge thereof, for abutting a wall of the tank when the tank is in an operative position, for effecting a seal, a baffle plate spaced from the rear wall and the sealed joint, for protecting said joint from material being mixed, an air connection over one of the perforations in the cover for cooling the baffle plate and tank walls by air under pressure forced therethrough, the said connection and the perforation being disposed between the baffle plate and the said wall of the tank, an agitator within the tank, and means for exhausting the air admitted into the tank.

17. The combination of a tiltable mixing tank comprising walls and a bottom, a stationary perforate cover therefor, abutting means carried by the cover adjacent an edge thereof, for abutting a wall of the tank when the tank is in an operative position, for effecting a seal, a baffle plate spaced from the wall and the sealed joint, for protecting said joint from substance being mixed, an air connection over one of the perforations in the cover for cooling the baffle plate and tank walls by air under pressure forced therethrough, the said connection and perforation being disposed between the baffle plate and said wall of the tank, a scraper adapted for scraping adhering substance from the under side of the cover when the tank is tilted, an agitator, and air exhaust means.

18. The combination of a tiltable mixing tank comprising walls and a bottom, a stationary cover therefor, means associated with one wall and the cover for effecting a sealed joint therebetween when the tank is in a normally operative position, a baffle plate spaced from the wall and comprising a scraper, the scraper being disposed upon the upper portion of the baffle plate and in close proximity with the cover, for removing adhering substance from the under side of the cover, an agitator within the tank adapted for directing mixable substance against the baffle plate, and means for moving the agitator and tilting the tank.

19. The combination with a tiltable mixing tank comprising walls and a bottom, a stationary cover therefor, means associated with one wall and the cover for effecting a sealed joint therebetween when the tank is in a normally operative position, a baffle plate spaced from the wall and comprising a scraper, the scraper being disposed upon the upper portion of the baffle plate and in close proximity with the cover for scraping substance from the under side of the cover, an air connection carried by the cover for directing a current of air into the tank, and an agitator for directing mixable substance toward the baffle plate.

In testimony whereof, I have hereunto subscribed my name this 28th day of December, 1925.

ERWIN S. MASON.